United States Patent [19]

Blatt

[11] Patent Number: 5,215,181

[45] Date of Patent: * Jun. 1, 1993

[54] DUAL-BELT SHUTTLE UNIT

[76] Inventor: John A. Blatt, 22 Stratton Pl., Grosse Pointe Shores, Mich. 48236

[*] Notice: The portion of the term of this patent subsequent to Jan. 2, 2010 has been disclaimed.

[21] Appl. No.: 837,009

[22] Filed: Feb. 14, 1992

Related U.S. Application Data

[63] Continuation of Ser. No. 636,628, Jan. 2, 1991, abandoned.

[51] Int. Cl.$^5$ .............................................. B65B 47/00
[52] U.S. Cl. ................... 198/468.2; 198/468.01; 414/752
[58] Field of Search ............... 198/583, 468.2, 468.01, 198/468.6; 414/749, 751, 752

[56] References Cited

U.S. PATENT DOCUMENTS

| | | | |
|---|---|---|---|
| 3,546,956 | 12/1970 | Blatt | 74/394 |
| 3,665,771 | 5/1972 | Blatt | 74/29 |
| 3,966,058 | 6/1976 | Heffron et al. | 198/468.2 X |
| 4,182,442 | 1/1980 | Jones | 198/468.2 X |
| 4,361,413 | 11/1982 | Toda | 414/752 |
| 4,372,538 | 2/1983 | Balfanz | 266/69 |
| 4,386,693 | 6/1983 | Bachman | 198/409 |
| 4,444,540 | 4/1984 | Blatt | 414/589 |
| 4,475,863 | 10/1984 | Blatt | 414/589 |
| 4,543,034 | 9/1985 | Blatt | 414/752 |
| 4,553,444 | 11/1985 | Blatt | 74/110 |
| 4,688,668 | 8/1987 | Ookubo et al. | 198/621 |
| 4,988,261 | 1/1991 | Blatt | 414/749 |
| 4,995,505 | 2/1991 | Takahashi et al. | 198/468.4 |
| 5,002,448 | 3/1991 | Kamijima et al. | 414/225 |
| 5,011,001 | 4/1991 | Cameron | 198/468.2 |

FOREIGN PATENT DOCUMENTS 3241006 5/1984 Fed. Rep. of Germany ... 198/468.2

Primary Examiner—Robert P. Olszewski
Assistant Examiner—James R. Bidwell
Attorney, Agent, or Firm—Basile and Hanlon

[57] ABSTRACT

A dual-belt shuttle unit for transporting an article lifting device between work stations includes a fixed frame assembly for supporting the overhead transfer system. A bracket assembly, supported by the fixed frame, extends along a horizontal plane between two work stations. The bracket has two guide rails extending the length of the assembly for guiding a multiplicity of carriage assemblies in a horizontal plane relative to the bracket assembly. A conveyor system drives the carriage assemblies. The drive unit for the conveyor system is demountable and replaceable when required to transfer heavier workloads. The dual-belt shuttle unit is self-supporting and can be attached in series to several other dual-belt shuttle units to create a complete assembly line.

25 Claims, 5 Drawing Sheets

DUAL-BELT SHUTTLE UNIT

This application is a continuation of application Ser. No. 07/636,628, filed on Jan. 2, 1991, now abandoned.

BACKGROUND OF THE INVENTION

Field of the Invention

The present invention is directed to a dual-belt shuttle unit, more specifically, a horizontal dual-belt shuttle unit extending in a horizontal plane in a production line setting. The dual-belt shuttle unit typically transfers an article lifting device in a horizontal path from a first work station to a second work station.

Description of the Prior Art

Dual-belt shuttle units of the general type with which the present invention is concerned typically include a fixed frame extending between a first and second work station and a single carriage dual-belt shuttle unit for transporting an article lifting device between the work stations. A drive unit is permanently mounted to the fixed frame and drives the conveyor system which transfers the article lifting device in a horizontal plane on the carriage dual-belt shuttle unit.

A disadvantage of this previous system is that it requires a separate fixed frame and carriage dual-belt shuttle unit, along with a continuous support frame structure spanning several work stations. Further, each drive unit is permanently disposed o the fixed frame member thereby eliminating any possibility of exchanging a heavy duty drive unit for a lightweight drive unit when lifting and transporting different sized workpieces.

The present invention is directed to a dual-belt shuttle unit for horizontally transferring an article lifting device able to support multiple carriage dual-belt shuttle units for transferring the article lifting device between multiple work stations. The fixed frame member of the dual-belt shuttle unit is extendable along a horizontal plane between each work station. If necessary, the frame members may be attached in series along the work path to create a single assembly line as necessary. Each unit is self-supporting and, therefore, easily replaceable. Furthermore, each unit contains its own separate drive unit which itself is demountable and readily replaceable.

SUMMARY OF THE INVENTION

A dual-belt shuttle unit embodying the present invention includes a fixed frame assembly for supporting the overhead transfer system. A bracket assembly, supported by the fixed frame, extends along a horizontal plane between two work stations. The bracket assembly has two guide rails extending the length of the assembly and spanning the width of the bracket.

A carriage assembly is provided for transporting an article lifting device along the bracket assembly between work stations. The carriage assembly includes a plurality of rollers provided at opposite ends of the carriage assembly. The rollers engage the rails provided on the bracket assembly to guide the carriage assembly in horizontal movement relative to the bracket assembly.

A conveyor system is supported between the bracket assembly and the carriage assembly to transport the carriage assembly along the horizontal path. The conveyor system comprises a drive gear and an idler roll defining the outer limits of the horizontal plane and a conveyor belt extending around and meshing with the gears. The conveyor belt is permanently attached to the carriage assembly by an L-shaped bracket connected to the interior of the carriage assembly.

A separate drive unit is provided for each shuttle assembly. The drive unit is demountable from the bracket assembly. This enables an operator to change the drive unit to correspond with an increase in the power needed to transfer different workpieces between the work stations. Therefore, as the workpiece to be transported increases in size or weight between work stations, the proper drive unit may be mounted on each dual-belt shuttle unit to accommodate this increase.

Each dual-belt shuttle unit may accommodate a plurality of carriage assemblies where needed. Each carriage assembly is provided with its own separate drive unit. The corresponding conveyor systems for transporting the carriage assemblies lie parallel to other conveyor systems within the bracket assembly. In this way, each dual-belt shuttle unit and each carriage assembly is self-enclosed, thereby enabling a multiplicity of changes as required along the transfer system.

Finally, each dual-belt shuttle unit may be attached to a subsequent dual-belt shuttle unit in series to create a complete transfer system. Each self-enclosed dual-belt shuttle unit may be moved to any position within the assembly plant to accommodate any changes in the layout of the assembly work stations.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawings, in which like reference characters refer to like parts throughout the views, and in which.

DETAILED DESCRIPTION OF THE PREFERRED EMBODIMENT

Figure 1A:
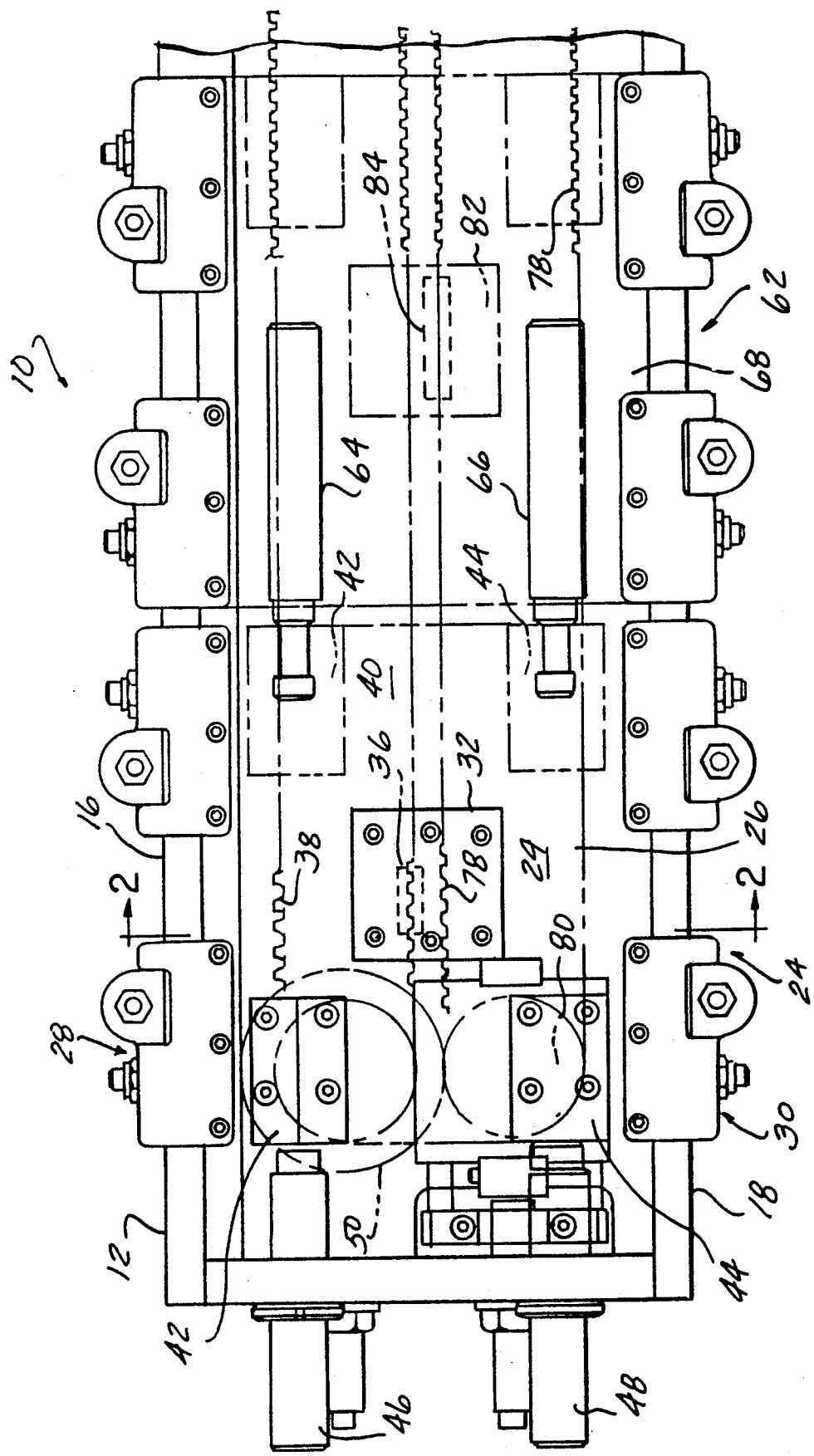
FIG. 1A is a front elevational view of the left end of a dual-belt shuttle unit in accordance with the present invention
Figure 1B:
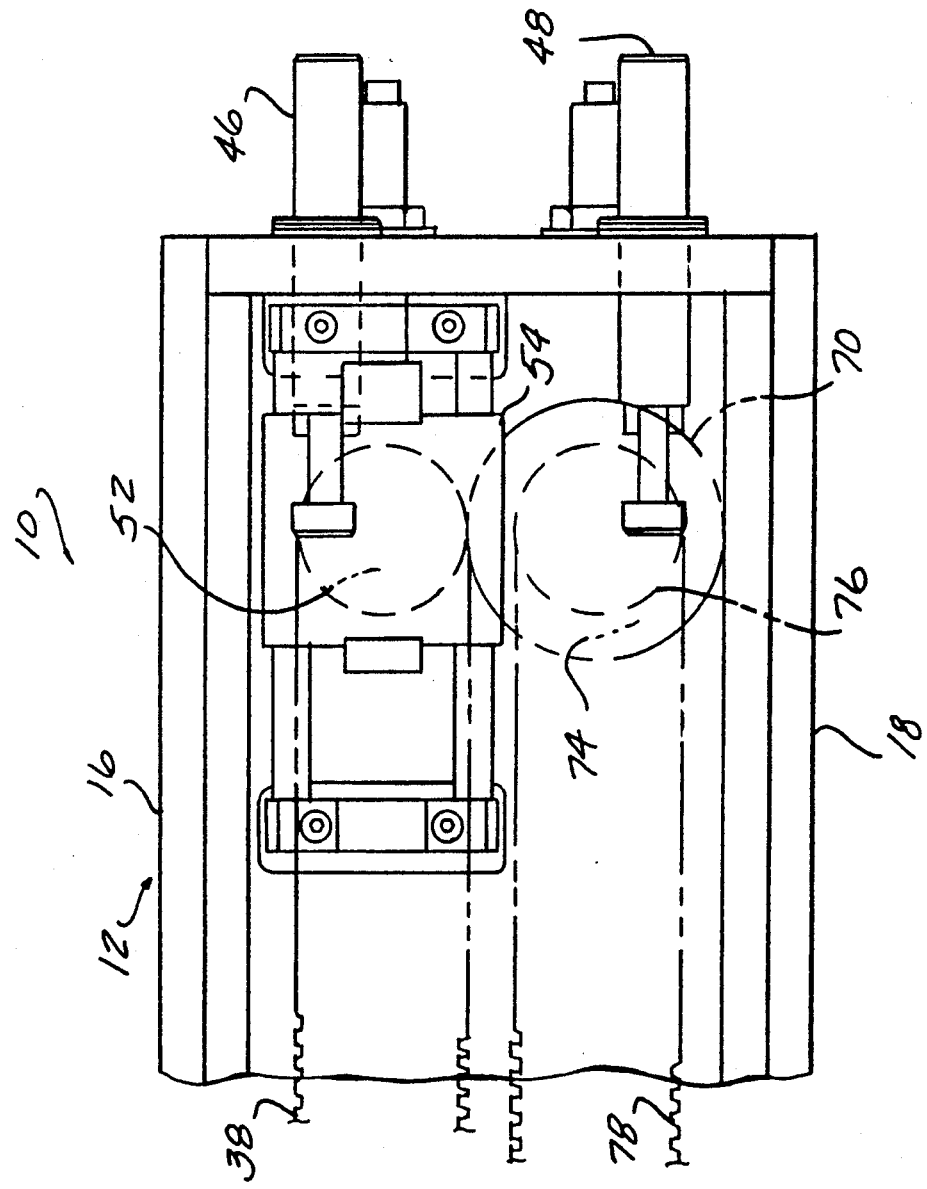
FIG. 1B is a front elevational vie of the right end of the dual belt shuttle unit.
Figure 2:
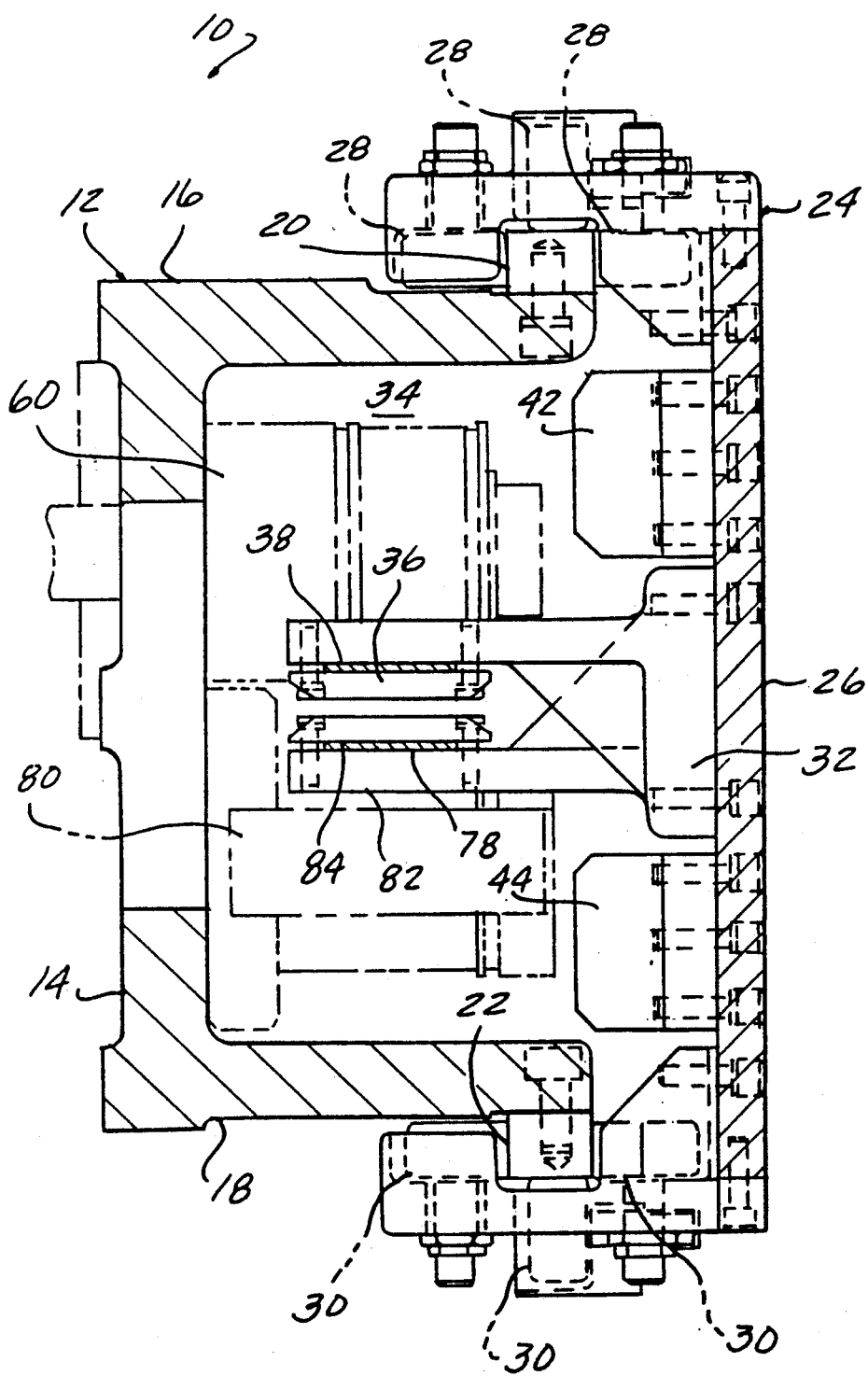
FIG. 2 is a fragmentary cross sectional view taken along line 2—2 of FIG. 1A.
Figure 4:
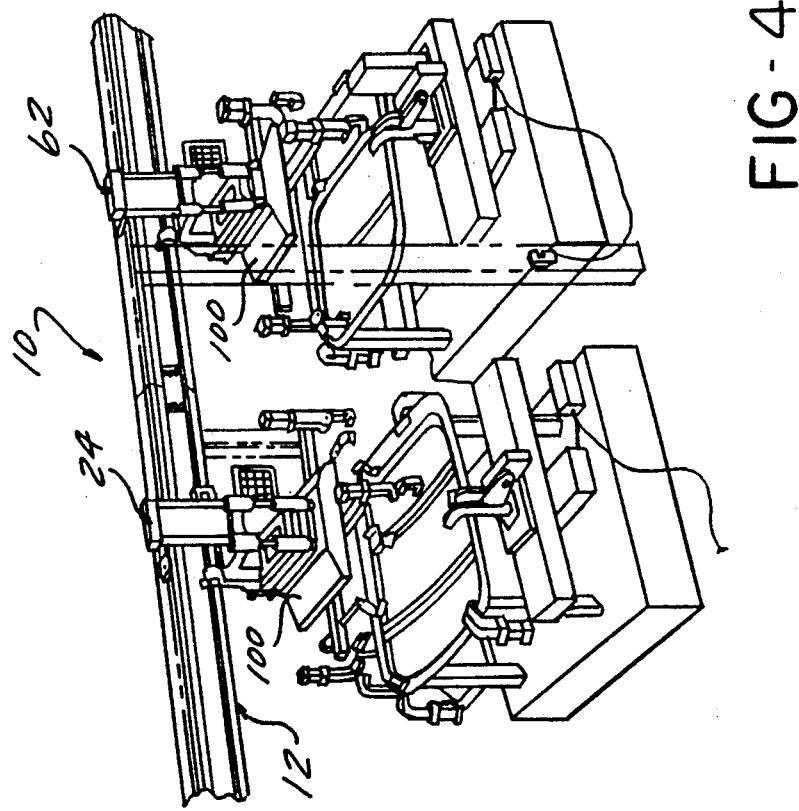
FIG. 4 is a perspective view of a dual-belt shuttle unit in use in accordance with the present invention.

Referring to FIGS. 1A, 1B and 4, a dual-belt shuttle unit 10 includes a bracket assembly 12 extending in a horizontal plane. The bracket assembly 12 is substantially C-shaped as best seen in FIG. 2. The bracket assembly 12 consists of an elongate vertical member 14 and opposing integral horizontal members 16, 18 extending transversely from each end of the vertical member 14.

Guide rails 20, 22 extend outwardly from each opposing horizontal member 16, 18. The guide rails 20, 22 extend parallel to the vertical member 14 the entire length of the bracket assembly 12.

A carriage assembly, designated generally at 24, is provided for transporting a lift unit 100 (FIG. 4) in the horizontal plane along the bracket assembly 12. A carriage plate 26 spans the width of the bracket assembly 12. Roller assemblies 28, 30 are provided at opposite ends of the carriage plate 26 and engage the guide rails 20, 22 to guide the carriage assembly 24 in horizontal movement relative to the bracket assembly 12.

With reference now to FIG. 2, an L-shaped bracket 32 is secured to the interior of the carriage plate 26 and extends between the open area 34 provided between the carriage assembly 24 and the bracket assembly 12. A plate 36 secures a drive belt 38 of the conveyor assembly 40 to the carriage assembly 24.

As can best be seen in FIGS. 1A and 2, bearing blocks 42, 44 are located adjacent the L-shaped bracket 32 at approximately each corner of the carriage plate 26. Shock absorbers 46, 48 are attached to each corner of the bracket assembly 12. The placement of the bearing blocks 42, 44 on the carriage plate 26 correlates with the placement of the shock absorbers 46, 48 on the bracket assembly 12.

The conveyor assembly 40 is supported substantially by the bracket assembly 12. The conveyor assembly 40 includes the drive belt 38 rotated about two opposing sprockets or end gears 50 (FIG. 1A), 52 (FIG. 1B), where end gear 50 is a driving gear and end gear 52 is an idler roll. Gears 50, 52 are fixedly attached to opposite ends of the bracket assembly 12 while drive belt 38 rotates about end gears 50, 52. A take-up assembly 54 is provided with end gear 52 at one end of the bracket assembly 12.

Figure 3:
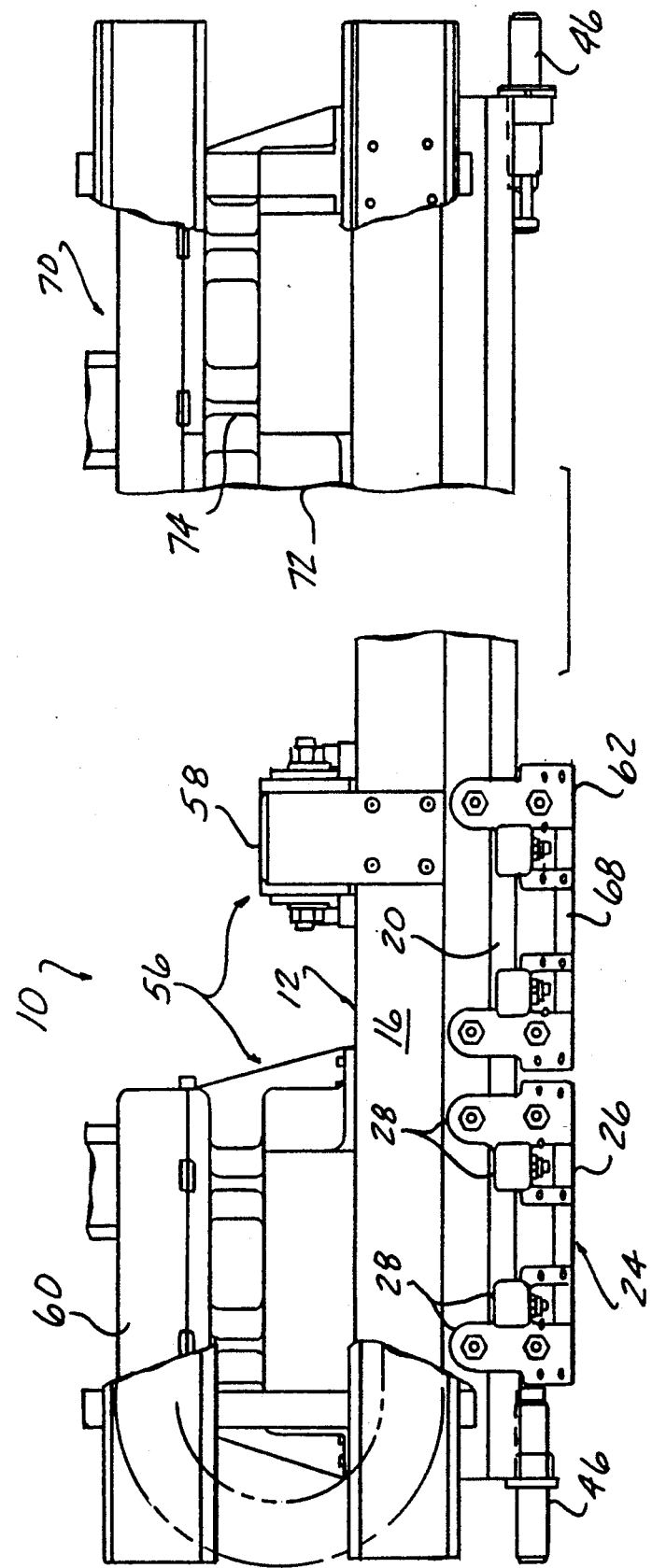
FIG. 3 is a combined top view of FIGS. 1A and 1B.

Referring to FIG. 3, a drive unit 56 is mounted to the bracket assembly 12 parallel to the drive gear 50. Drive 56 includes a reversible electric motor 58 which is drivingly coupled to a transmission unit 60 (FIGS. 2 and 3) mounted adjacent to the electric motor 58 on the bracket assembly 12. Drive gear 50 is driven by transmission unit 60.

With reference now to FIG. 1A, a second carriage assembly 62 may be provided on the dual-belt shuttle unit 10, if necessary. This second carriage assembly 62 is substantially identical to carriage assembly 24 and includes shock absorbers 64, 66 attached to second carriage plate 68. The shock absorbers 64, 66 are located on the second carriage plate 68 parallel with bearing blocks 42, 44 on carriage plate 26.

A second drive unit 70 (FIGS. 1B and 3) for driving the second carriage assembly 62 is located opposite drive unit 56 on the bracket assembly 12. Second drive unit 70 includes a reversible electric motor 72 which is drivingly coupled to a transmission unit 74. Transmission unit 74 drives drive gear 76 and rotates drive belt 78 about end gear 80 (FIG. 1A) and drive gear 76. Drive belt 78 is located parallel to drive belt 38 in the bracket assembly 12. Drive belt 78 is secured to the second carriage plate 68 by L-shaped bracket 82 and plate 84.

In use, the dual-belt shuttle unit 10 is arranged in a fixed frame structure (FIG. 4) between work stations for transferring a workpiece. Bracket assembly 12 spans the area between the two work stations. Carriage assemblies 24, 62 are driven by drive units 56, 70, respectively, to transfer an article lifting devices 100 from a first work station to a second work station. Shock absorbers 46, 48 prevent each carriage assembly 24, 62 from overriding the span of the bracket assembly 12. Shock absorbers 64, 66 prevent carriage assemblies 24, 62 from colliding into each other.

An advantage of the dual-belt shuttle unit 10 is that each drive unit 56, 70 is demountable from the bracket assembly 12 and, therefore, replaceable with whatever drive unit is required for movement of individual workpieces. A further advantage of the dual-belt shuttle unit 10 is that a plurality of carriage assemblies may be supported in parallel within the bracket assembly 12. A still further advantage of the dual-belt shuttle unit is that each unit is self-supporting. Several dual-belt shuttle units may be connected in series by detachably connecting means such as bolts or rivets to produce a complete assembly line between a series of work stations. If the layout of the assembly line needs to be changed due to a manufacturing processing change, the dual-belt shuttle units can be easily removed and replaced in accordance with the new layout plan.

Having described my invention, however, many modifications thereto will become apparent to those skilled in the art to which it pertains without deviation from the spirit of the invention as defined by the scope of the appended claims.

I claim:

1. A power driven shuttle comprising:
   a single elongated bracket having first and second ends, said bracket substantially C-shaped and having an elongate vertical member and opposing horizontal members extending transversely form each end of said vertical member, and each of said horizontal members having a rail fixedly attached to an outer surface of said horizontal members extending parallel to said vertical member;
   at least one carriage mean for transporting a lift unit in a fixed path along said bracket, each carriage means further including a carriage plate slidably received about said bracket, a plurality of roller means at opposing ends of said plate for engaging said rails to guide said carriage means in movement relative to said bracket, at least one L-shaped bracket fixedly secured to an interior surface of said carriage plate and at least one bearing block fixedly secured to said interior surface of said carriage plate; and
   at least one conveyor means for transporting said carriage means along said fixed path.

2. The power-driven shuttle of claim 1 further comprising means for connecting said carriage means in series with a plurality of said carriage means on said single elongated bracket.

3. The power-driven shuttle of claim 1, wherein each of said plurality of conveyor means further comprises a drive and take-up unit disposed between said bracket and said carriage means and having a drive belt extending from a drive gear at one end of said bracket to an idler roller disposed at an opposite end of said bracket, said drive belt fixedly attached to said carriage plate by said L-shaped bracket for reciprocating said carriage plate in movement relative to said bracket.

4. The power-driven shuttle of claim 3, wherein said drive unit is demountable from each of said conveyor means.

5. The power-driven shuttle of claim 4 further comprising shock absorbing means fixedly attached to said bracket parallel with said carriage means for impacting with said bearing block.

6. The power-driven shuttle comprising:
   a substantially C-shaped bracket having an elongate vertical member and opposing horizontal members extending transversely from each end of said vertical member;

each of said horizontal members having a rail fixedly attached to an outer surface of said horizontal members extending parallel to said vertical member;

a plurality of carriage means for transporting a lift unit in a fixed path along said bracket, each of said carriage means including a carriage plate slidably received about said bracket assembly;

a plurality of roller means at opposing ends of said plate for engaging said rails to guide said carriage means in movement relative to said bracket assembly;

at least one L-shaped bracket fixedly secured to na interior surface of said carriage plate;

a plurality of conveyor means for transporting said carriage means in said fixed path, each of said conveyor means including a demountable drive and take-up unit disposed between said bracket and said carriage means and having a drive belt extending from a drive bear at one end of said bracket and an idler roller disposed at an opposite end of said bracket, said drive gear fixedly attached to said carriage plate by said L-shaped bracket for reciprocating said carriage plate in movement relative to said bracket;

shock absorbing means fixedly attached to said bracket parallel with said carriage means for impacting with said bearing block;

shock absorbing means fixedly attached to said plurality of said carriage means parallel with said bearing block for impacting with said bearing block; and means for connecting said carriage means in series with a plurality of said carriage means on said bracket.

7. A shuttle unit comprising:

support means having two spaced apart rails;

first carriage means for guided reciprocal movement along said two spaced apart rails between first and second locations, said first carriage means including a first plate extending between said two spaced apart rails and first roller means connected to said first plate for guidingly engaging said two spaced apart rails, said first carriage means further including a first bracket connected to said first plate and extending outwardly from said first plate between said two spaced apart rails;

energy absorbing means for dissipating kinetic energy of said first carriage means at first and second end limits of movement, said energy absorbing means including shock absorbers connected to said support means adjacent said first and second end limits of movement and bearing blocks connected to said first plate for engagement with said shock absorbers;

first endless belt means extending from one end of said support means to an opposite end of said support means and connected to said first bracket for reciprocally driving said first carriage means in guided movement along said two spaced apart rails between said first and second locations; and reversible drive means for driving said first endless belt means in a desired direction.

8. The shuttle unit of claim 7 wherein the support means further comprises:

a longitudinally elongated member having a transverse cross section including a generally vertically extending portion and opposing generally horizontally extending portions defining a generally C-shaped configuration, said two spaced apart rails connected adjacent respective outer ends of said opposing generally horizontally extending portions and facing outwardly away from one another.

9. The shuttle unit of claim 7 wherein said first endless belt means further comprises:

a first drive gear adjacent one end of said support means;

a first idler roller adjacent an opposite end of said support means; and a first endless drive belt extending between and around said first drive gear and said first idler roller for movement in clockwise and counter-clockwise direction.

10. The shuttle unit of claim 7 further comprising:

take-up means for removing slack from said first endless belt means.

11. The shuttle unit of claim 7 wherein said reversible drive means further comprises:

a first reversible electric motor; and a first transmission for transferring rotational motion form said first motor to said first endless belt means.

12. A shuttle unit comprising:

support means having two spaced apart rails;

first carriage means for guided reciprocal movement along said two spaced apart rails between first and second locations, said first carriage means including a first plate extending between said two spaced apart rails and first roller means connected to said first plate for guidingly engaging said two spaced apart rails, said first carriage means further including a first bracket connected to said first plate and extending outwardly from said first plate between said two spaced apart rails;

second carriage means for guided reciprocal movement along said two spaced rails between third and fourth locations, said second carriage means including a second plate extending between said two spaced apart rails and second roller means connected to said second plate for guidingly engaging said two spaced apart rails, said second carriage means further including a second bracket connected to said second plate and extending outwardly from said second plate between said two spaced apart rails;

first endless belt means extending from one end of said support means to an opposite end of said support means and connected to said first bracket for reciprocally driving said first carriage means in guided movement along said two spaced apart rails between said first and second locations; and reversible drive means for driving said first endless belt means in a desired direction.

13. The shuttle unit of claim 12 further comprising:

second endless belt means extending from one end of said support means to an opposite end of said support means and connected to said second bracket for reciprocally driving said second carriage means in guided movement along said two spaced apart rails between said third and fourth locations independent of said first carriage means.

14. The shuttle unit of claim 13 further comprising said second bracket connected to said second endless belt means to provide first and second carriage means connected in series along said support means.

15. The shuttle unit of claim 13 wherein said second endless belt means further comprises:
    a second drive gear adjacent one end of said support means;
    a second idler roller adjacent an opposite end of said support means; and
    a second endless drive belt extending between and around said second drive and said second idler roller for movement in clockwise and counter-clockwise direction.

16. The shuttle unit of claim 13 further comprising:
    second reversible drive means for driving said second endless belt means in a desired direction.

17. The shuttle unit of claim 16 wherein said second reversible drive means further comprises:
    a second reversible electric motor; and
    a second transmission for transferring rotational motion from said second motor to said second endless belt means.

18. The shuttle unit of claim 13 further comprising:
    second energy absorbing means for dissipating kinetic energy of said second carriage means and said first carriage means.

19. The shuttle unit of claim 18 wherein said second energy absorbing means further comprises:
    shock absorbers connected to one of said first and second carriage means; and
    bearing blocks connected to the other of said first and second carriage means for engagement with said shock absorbers.

20. The shuttle unit of claim 13 further comprising:
    second take-up means for removing slack from said second endless belt means.

21. A shuttle unit comprising:
    support means having two spaced apart rails, said support means including a longitudinally elongated member having a transverse cross section with a generally vertically extending portion and opposing generally horizontally extending portions defining a generally C-shaped configuration, said two spaced apart rails connected adjacent respective outer ends of said opposing generally horizontally extending portions and facing outwardly away from one another;
    first carriage means for guided reciprocal movement along said two spaced apart rails between first and second locations, said first carriage means including a first plate extending between said two spaced apart rails and first roller means connected to said first plate for guidingly engaging said two spaced apart rails, said first carriage means further including a first bracket connected to said first plate and extending outwardly from said first plate between said two spaced apart rails;
    first endless belt means extending adjacent one end of said support means to a positioned adjacent an opposite end of said support means and disposed between said opposing generally horizontally extending portions of said support means, said first endless belt means connected to said first bracket for reciprocally driving said first carriage means in guided movement along said two spaced apart rails between said first and second locations, said first endless belt means including a first drive gear adjacent one end of said support means, a first idler roller adjacent an opposite end of said support means and a first endless drive belt extending between and around said first drive gear and said first idler roller for movement in clockwise and counter-clockwise direction;
    first reversible drive means for driving said first endless belt means in a desired direction, said fist reversible drive means including a first reversible electric motor and a first transmission for transferring rotational motion from said first motor to said first endless belt means;
    first energy absorbing means for dissipating kinetic energy of said first carriage means adjacent said first and second locations, said first energy absorbing means including shock absorbers connected to one of said support means and said first carriage means, and bearing blocks connected to the other of said support means and said first carriage means for engagement with said shock absorbers; and
    first take-up means for removing slack from said first endless belt means.

22. The shuttle unit of claim 21 wherein said first roller means further comprises:
    first and second pairs of spaced apart sets of rollers engageable with said two spaced apart rails respectively, each set of rollers including a first roller engageable with one of said rails opposite one of said generally horizontally extending portions of said support means, and
    opposing second and third rollers engaged on opposite sides of said one of said rails.

23. The shuttle unit of claim 21 further comprising:
    second carriage means for guided reciprocal movement along said two spaced rails between third and fourth locations, said second carriage means including a second plate extending between said two spaced apart rails and second rollers means connected to said second plate for guidingly engaging said two spaced apart rails, said second carriage means further including a second bracket connected to said second plate and extending outwardly from said second plate between said two spaced apart rails.

24. The shuttle unit of claim 23 further comprising:
    second endless belt means extending form one end of said support means to an opposite end of said support means and connected to said second bracket for reciprocally driving said second carriage means in guided movement along said two spaced apart rails between said third and fourth locations independent of said first carriage means.

25. The shuttle unit of claim 24 further comprising said second bracket connected to said second endless belt means to provide first and second carriage means connected in series along said support means.

* * * * *

UNITED STATES PATENT AND TRADEMARK OFFICE
CERTIFICATE OF CORRECTION

PATENT NO. : 5,215,181
DATED : June 1, 1993
INVENTOR(S) : John A. Blatt

It is certified that error appears in the above-identified patent and that said Letters Patent is hereby corrected as shown below:

Column 1, line 29, please delete "o" and insert --on--.

Column 2, line 44, please delete "vie" and insert --view--.

Signed and Sealed this

First Day of March, 1994

Attest:

BRUCE LEHMAN

Attesting Officer     Commissioner of Patents and Trademarks